E. T. MILLER.
BORING MACHINE.
APPLICATION FILED APR. 13, 1917.

1,265,231.

Patented May 7, 1918.
10 SHEETS—SHEET 1.

WITNESSES:
John B. Schrott
Myron Clear

INVENTOR
Emma T. Miller
BY
Munn & Co.
ATTORNEYS

E. T. MILLER.
BORING MACHINE.
APPLICATION FILED APR. 13, 1917.

1,265,231. Patented May 7, 1918.
10 SHEETS—SHEET 4.

WITNESSES
John S. Schrott
Myron L. Clear

INVENTOR
Emma T. Miller
BY
ATTORNEYS

E. T. MILLER.
BORING MACHINE.
APPLICATION FILED APR. 13, 1917.

1,265,231.

Patented May 7, 1918.
10 SHEETS—SHEET 7.

E. T. MILLER.
BORING MACHINE.
APPLICATION FILED APR. 13, 1917.

1,265,231.

Patented May 7, 1918.
10 SHEETS—SHEET 9.

WITNESSES:
John B. Schrott
Myron G. Clear

INVENTOR
Emma T. Miller
BY
Munn & Co.
ATTORNEYS

UNITED STATES PATENT OFFICE.

EMMA T. MILLER, OF SAN ANTONIO, TEXAS.

BORING-MACHINE.

1,265,231.  Specification of Letters Patent.  Patented May 7, 1918.

Application filed April 13, 1917. Serial No. 161,836.

*To all whom it may concern:*

Be it known that I, EMMA T. MILLER, a citizen of the United States, and a resident of San Antonio, in the county of Bexar and State of Texas, have invented a certain new and useful Improvement in Boring-Machines, of which the following is a specification.

My present invention relates generally to boring machines, and more particularly to a machine for boring brush blanks, my primary object being to provide a machine which will bore all of the necessary openings, both straight and at an angle, at a single operation.

Among the various other objects of the invention, I aim to provide a pair of relatively movable boring heads, each having a battery of bits, together with means whereby to so move the short bits as to cause quick clean movement of the same into the blanks.

Another object is to provide relatively movable boring heads, together with means controlled by the movements of the head, for automatically feeding blanks therebetween.

A still further object of the invention is to provide simple and effective means for discharging the bored blanks and disposing of the chips or cuttings.

Further objects and the advantages of my invention, will be better understood from the following description thereof, in which reference is made to the accompanying drawings, forming parts of this specification and wherein—

Fig. 2 is a partial front elevation.

Fig. 6 is a vertical transverse section taken substantially on line 6—6 of Fig. 4.

Fig. 7 is a sectional view showing on an enlarged scale a portion of what is shown in Fig. 4.

Fig. 8 is a detail fragmentary perspective view of parts to be hereinafter specifically referred to.

Fig. 19 is a detail horizontal section taken substantially on line 19—19 of Fig. 18, with the boring heads open.

Fig. 20 is a similar view with the boring heads closed.

Fig. 21 is a detail perspective view of one of the bits.

Fig. 22 is an enlarged detail section taken on line 22—22 of Fig. 17.

Figs. 23 and 24 are detail sections taken substantially on lines 23—23 and 24—24 of Fig. 16.

Fig. 25 is a vertical section taken on line 25—25 of Fig. 10.

Fig. 29 is a detail side view partly in section, showing the automatic feeding parts as a blank is clamped between the boring heads.

Figure 1:
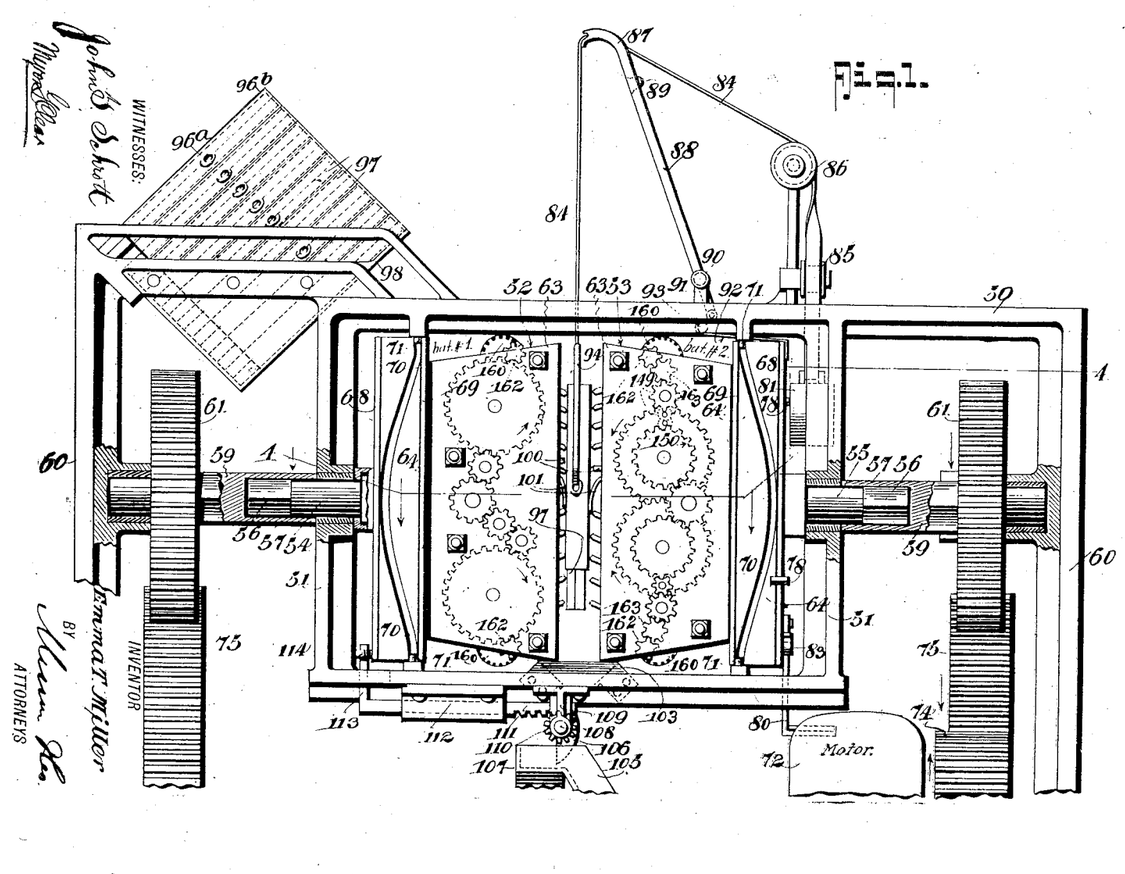
Figure 1 is a partial side elevation, portions being broken away and in section.

Referring now to these figures, and particularly to Figs. 1 and 2, my improvements are preferably mounted in a generally rectangular frame 50, at the sides of which are inner rectangular frames 51, within the latter of which the opposing boring heads 52 and 53 are movable horizontally toward and away from one another, these boring heads being respectively at the inner ends of rotatable shafts 54 and 55 journaled through the side portions of the inner frame 51 as particularly seen in Fig. 1, and having squared portions 56 engaging squared sockets 57 at the inner ends of shafts 58 and 59, the latter being journaled in the forward and rear uprights 60 of the main frame 50 and having thereon the gear wheels 61, each of which gear wheels is thus located adjacent one corner of the main frame 50.

Figures 3, 4:
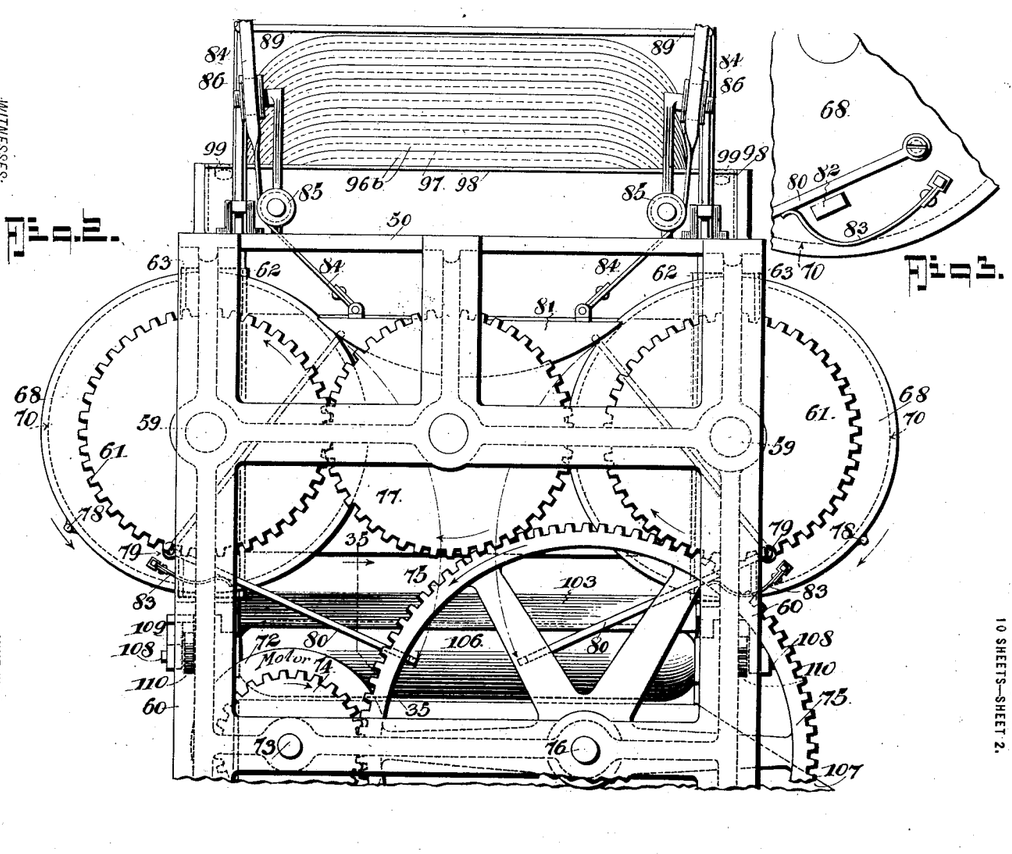
Fig. 3 is a fragmentary detail elevation of a portion of Fig. 2.
Fig. 4 is a horizontal section taken substantially on line 4—4 of Fig. 1.
Figure 4:
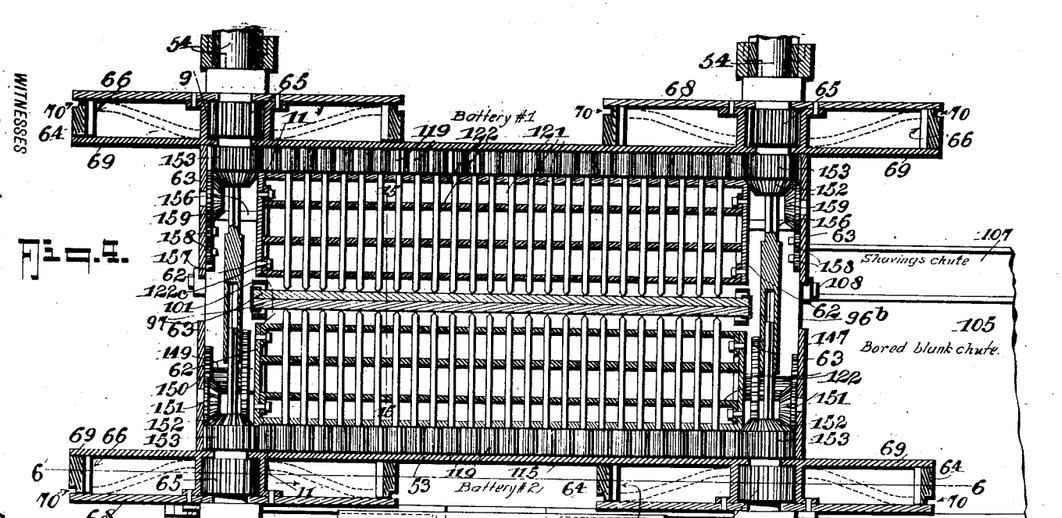

The sliding joint between the shafts 59 of the gear wheels 61 and the shafts 54 and 55 of the boring head, thus admits of relative movement of the boring heads with respect to one another, it being understood by reference to Fig. 4 that the two shafts 54 are adjacent relatively opposite sides of the boring head 52 and the two shafts 55 are similarly adjacent relatively opposite ends of the boring head 53.

Figures 6, 7, 8:
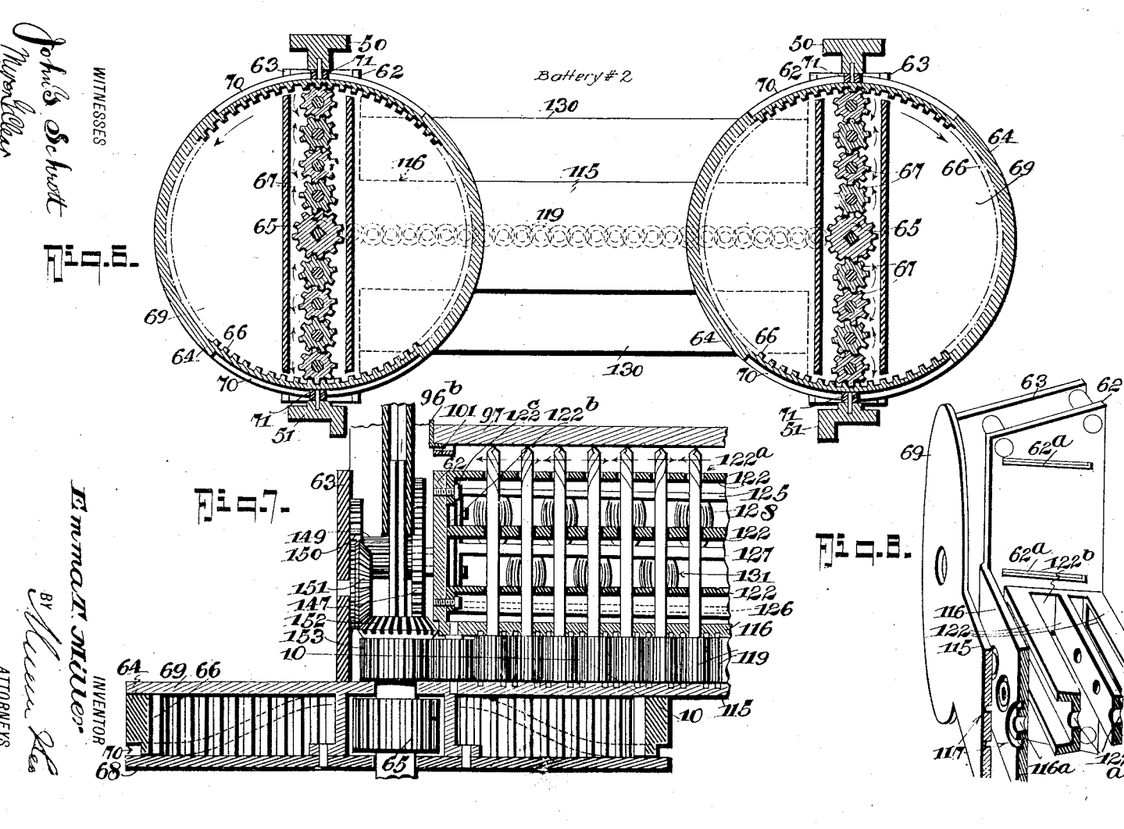

The inner portions of the several shafts 54 and 55 extend into the respective boring heads between relatively fixed inner and outer side plates 62 and 63 at opposite sides of each boring head and through annular controlling rings 64, the shafts being provided within the rings 64 with gear wheels 65, the latter in driving connection with the inner geared peripheries 66 of the said rings 64 through series of idlers 67, as plainly seen by reference to Fig. 6, these idlers being journaled in spaced outer and inner plates 68 and 69 between which the rings 64 are disposed and rotatable.

The several rings 64 are provided with annular cam grooves 70 which, as best seen in Fig. 1, are engaged by rigid lugs 71 projecting inwardly from the upper and lower portions of the inner frames 51 and which thus cause relative movement of the boring heads 52 and 53 toward and away from one another during rotation of the shafts 54 and 55.

Referring again to Figs. 1 and 2, a driving motor 72 is mounted in the lower portion of the main frame 50 and its shaft 73 is provided with a gear wheel 74 driving a pair of master gears 75 mounted upon a shaft 76, each of the said master gears 75 rotating the two shafts 59 of one of the boring heads, the connections at the rear of the frame for boring head 52 being identical with those at the forward portion of the frame for boring head 53, and as clearly seen in Fig. 2.

Thus, as seen in Fig. 2, the master gear 75 at the portion of the main frame, directly connects with the gear wheel 61 of one of the shafts 59 of boring head 52, and with an intermediate idler 77 in turn in engagement with the gear wheel 61 of the other shaft 59 of the boring head 52, so as to rotate the two annular rings 64 of the boring head 52 in relatively opposite directions, as indicated by the arrows in Fig. 2, these rings 64 being provided with laterally outstanding lugs 78 at diametrically opposite points projecting beyond the outer stationary plate 68 of the said rings, for a purpose which will be presently described.

To the outer side plate 68 as shown in Fig. 2, are pivotally connected, at 79, the outer ends of a pair of weight lifting arms 80, the inner ends of which are free to swing vertically under actuation of the lugs 78 in the travel of the latter, the arms 80 being thus elevated to the dotted line positions in Fig. 2, twice during each complete revolution of the rings 64, said arms falling to the position shown in full lines after the release of the corresponding lugs 78 from the upper free ends of the arms in the raised position thereof. A weight 81 is vertically movable in the forward portion of the frame and is alternately raised and released by the arms 80, the latter upon their release from lugs 78 falling against stops 82 attached to the plate 68 and one of which is shown in Fig. 3, springs 83 being also secured to the plate 68 to receive the arms 80 and absorb the shock of contact thereof with the stops 82.

The weight 81 is suspended by flexible connections 84 attached at their lower ends adjacent the opposite ends of the weight and the upper portions of which straps pass upwardly and rearwardly over guide rollers 85 and 86 and through the slotted upper ends 87 of a pair of vertically swinging arms 88 at opposite sides of the main frame 50, these arms being connected adjacent their upper ends by a cross piece 89, see Fig. 2, and being fulcrumed adjacent their lower ends at 90 upon brackets 91 upstanding from the sides of the frame 50, the lower extremities of the arms 88 being connected by flexible connections 92 passing forwardly around guides 93 and attached to the outer plates 68 of the boring head 53, as clearly seen in Figs. 1 and 29.

Figures 30, 31, 33, 34:
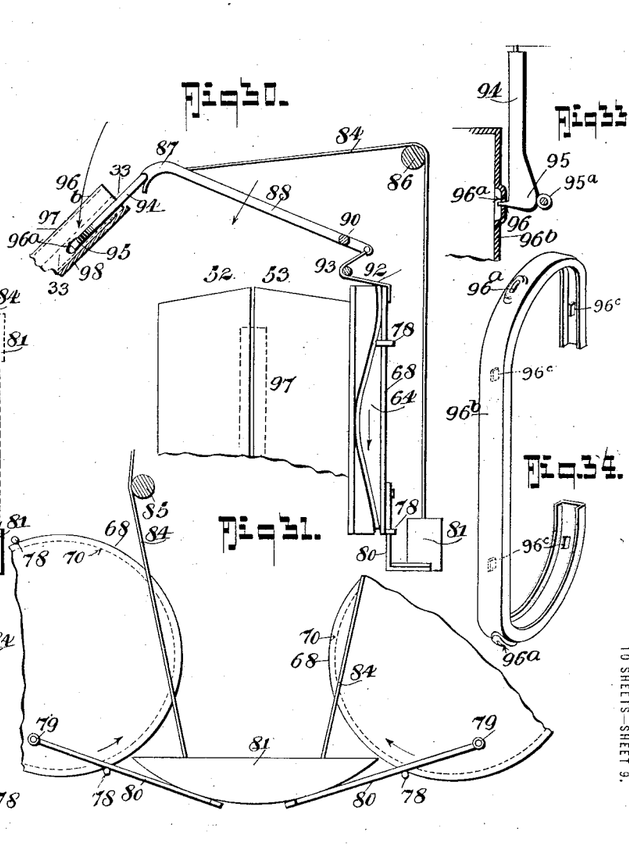
Fig. 30 is a similar view showing the parts picking up a new blank.
Fig. 31 is a side view of the weight controlling connections.
Fig. 33 is a view showing the initial position of one of the grappling hooks to engage a pair of blanks.
Fig. 34 is a detail perspective view of one of the clamps for holding a pair of blanks.

The outer ends of the straps 84 are secured to grappling members 94 which, upon downward movement of the weights 81 are borne upwardly against the upper ends of the arms 88 to the position shown in full lines in Figs. 29 and 30, it being noted from Fig.

33 that each of the grappling members 94 is provided with an enlarged cam-shaped outer head 95 having an inwardly projecting spur 96.

Referring again to Figs. 1 and 2, the brush blanks 97 are superposed upon one another in pairs within a receptacle formed therefor in the rear portion of the frame 50, and in forwardly and upwardly inclined relation upon the forwardly and upwardly inclined base 98 of said receptacle. Between the sides 99 of this receptacle and the stack of blanks therein, are projected the grappling members 94, as shown in Fig. 30, when the arms 88 fall rearwardly to the grappling position, as shown in Fig. 30, so that when the arms 88 are again drawn upwardly and forwardly, the spur 96 of the grappling members 94 will engage in side openings 96$^a$ of the clamp 96$^b$, as seen in Figs. 33 and 34, of the lowermost pair of blanks 97, each of said clamps being of channeled spring metal to receive and clamp the edges of a pair of blanks in face to face relation, and preferably spaced apart slightly by means of internal lugs 96$^c$ carried by the clamp 96, and, as seen in Fig. 34, engagement of the spurs 96 in the clamp openings 96$^a$ is caused by rollers 95$^a$ carried by the receptacle base 98 and against which the heads 95 move, one of said rollers being shown in Fig. 33.

Figures 18, 19, 20, 21, 22, 23:
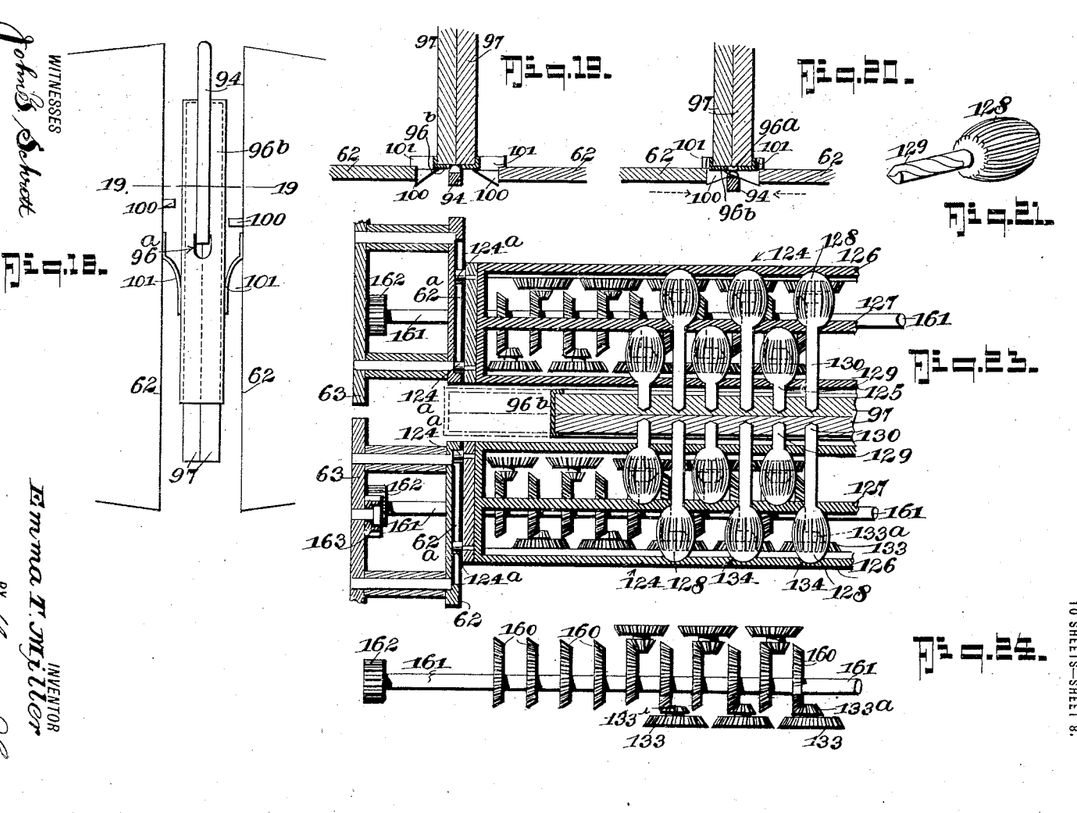

The operation of these parts is as follows: With the heads 52 and 53 spaced apart, as seen in Fig. 32, the arms 88 are held in upright position by the strap connection 92 at the lower ends thereof with the head 53, and thus during raising movement of the weight 81 by the arms 80 the grappling members 94, with the blanks 97 engaged thereby, are lowered between the spaced boring heads, and the blanks 97 are engaged and held by the master bits of the two boring heads when the latter are again moved toward one another, at the time the weight 81 is released; the grappling members 94 being at the same time disengaged from the blank clamped between the boring heads by means of angular spaced lugs 100, as shown in Figs. 19 and 20, and carried by the inner fixed side plates 62 of the boring head, which lugs engage between the side edges of the clamp 96$^b$ and the grappling members 94 and force the latter away from the blank and thus free them of engagement therewith, as seen by comparison of Figs. 19 and 20.

Figures 32, 35:
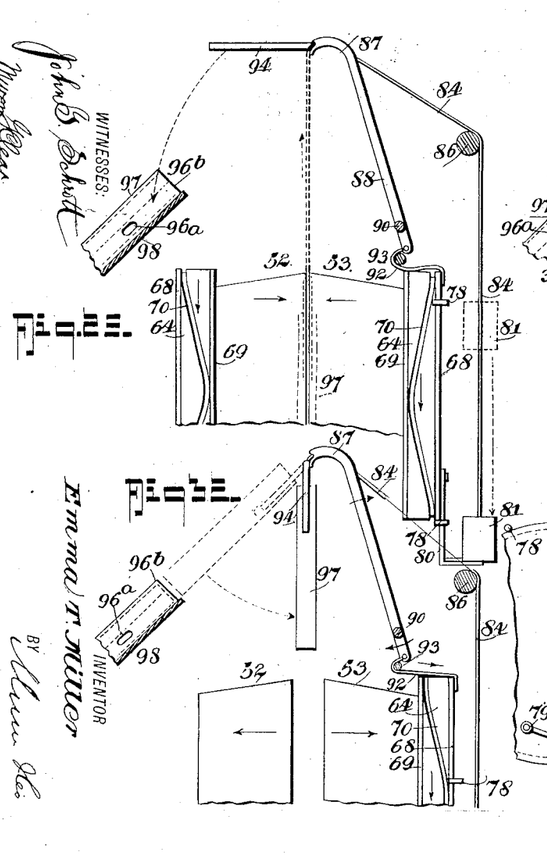
Fig. 32 is a view similar to Fig. 30 with the new blank ready for lowering into the space between the boring heads.
Fig. 35 is a detail view partly in elevation and partly in section illustrating portions of the chip and bored brush back discharging means, the chip pan being tilted.

The arms 80 and weight 81 after falling, again start to rise upon engagement therewith of the next successive lugs 78, and the boring heads 52 and 53 being closed at this time, vertical movement of the weight 81 permits the arms 88 to fall rearwardly to the position shown in Fig. 30, and thus, when the boring heads 52 and 53 again move away from one another to the open position, the arms 88 are drawn upwardly to the position shown in Fig. 32, and while the boring heads are open, upward movement of weight 81 permits the grappling members 94 with engaged blanks, to descend between the boring heads from the position shown in Fig. 32.

After the boring operation, the blanks now bored to form brush backs, and previously released from the grappling members 94 in the manner described, are permitted to drop out of the space between the boring heads 52 and 53 when the latter are moved to open position. The blanks so released are prevented from following the movement of either of the boring heads by springs 101, shown in Figs. 18, 19, and 20, which project inwardly from the fixed inner side plate 62 62 of each of the boring heads and engage the opposite faces of the blanks adjacent the side edges thereof. The bored brush backs dropping from the space between the boring heads as described fall through the lower opening 102 of a trough 103 supported in the lower portion of the inner frames 51 below the boring head, as shown in Fig. 35, and will be deflected by an inclined plate 104 into an inclined laterally projecting chute 105, as seen also in Fig. 4. The space below the opening 102 of the trough 103 is normally taken up by a chip receiving pan 106, tiltable at properly spaced intervals, as shown in Fig. 35, to permit the bored blanks to descend into the chute 105 in the manner just previously described, and to discharge the chips received therein during the boring operation, into a laterally projecting discharge chute 107 for the chips or borings. To this end, the trunnions 108 at the ends of the pan 106, as shown in Fig. 1, and which are journaled in brackets 109 depending from the inner rectangular frames 51, are provided with gear wheels 110 in mesh with the teeth of rack bars 111, the latter having bearings 112 attached to the inner rectangular frames 51 and having upper angular opposite ends 113 extending through and engaged by eyes 114 projecting rearwardly from the outer plate 68 of the boring head 52. This construction is preferably present at each end of the chip pan 106 in order to obviate unbalanced strain upon the boring head 52.

Figures 35, 36:
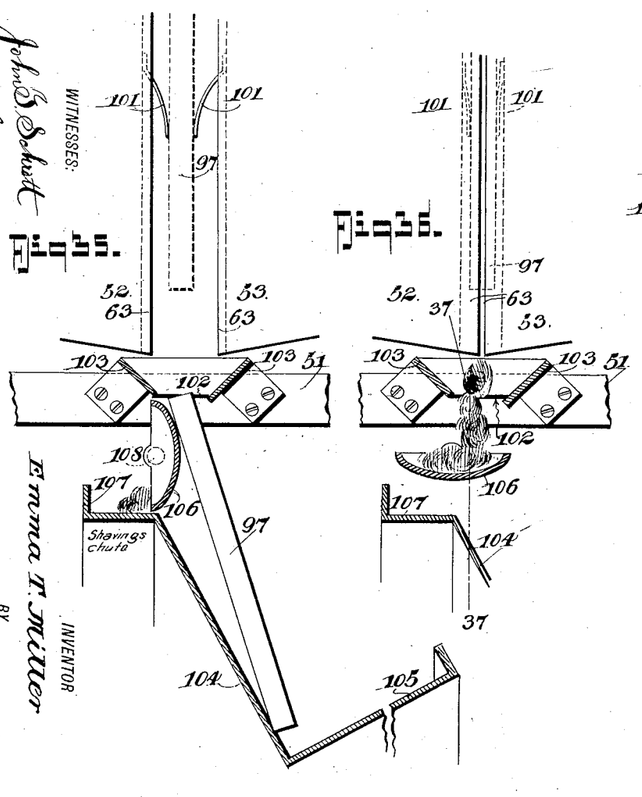
Fig. 36 is a similar view with the chip pan in operative position.
Figure 37:
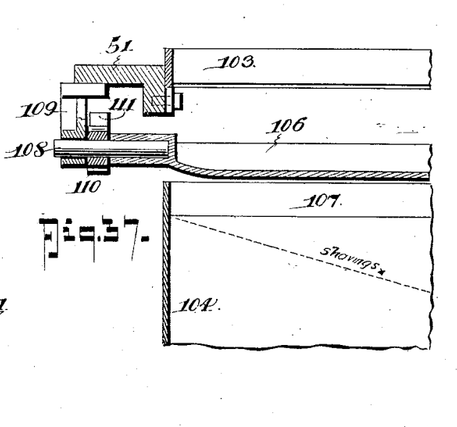
Fig. 37 is a detail vertical section taken substantially on line 37—37 of Fig. 36.

Thus in operation when the boring heads are moved away from one another to open position, longitudinal movement of the rack bars 111 will turn the chip pan 106 to vertical position as shown in Fig. 35 to provide for the passage thereby of the released and bored brush backs 97, and the discharge of the contents of the pan into the chute 107, and when the boring heads 52 and 53 are again moved to closed position, the reverse movement of rack bars 111 will again turn the chip pan 106 to the horizontal position shown in Fig. 36.

Figure 5:
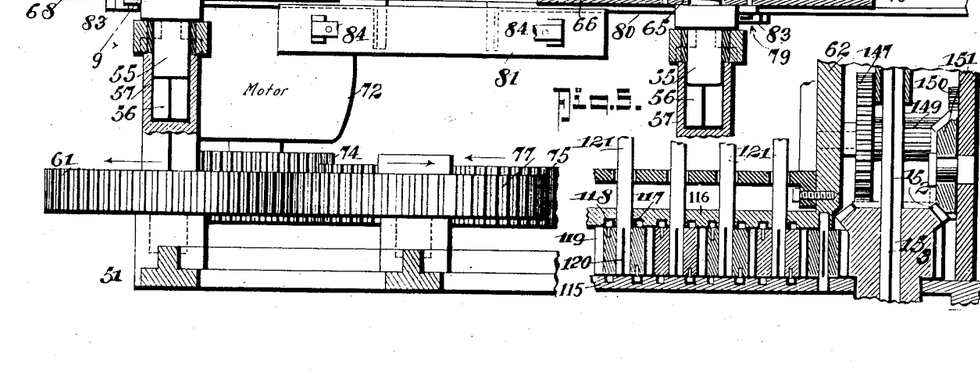
Fig. 5 is an enlarged detail of a portion of Fig. 4.

Referring now to Figs. 4 and 8, it will be noted that the plates 69 at the inner sides of the grooved ring 64 of each of the boring heads 52 and 53, and centrally through which the shafts 54 and 55 are projected inwardly into the space between the inner and outer side plates 62 and 63, are connected by a wall 115 in spaced parallel relation to a similar wall 116 connecting the inner side plates 62 at the relatively opposite sides of the respective boring heads, said opposed spaced walls 115 and 116 having annular grooves 117 opposite one another and in horizontal series to receive rollers 118 carried by projections extending from opposite faces of a series of gear wheels 119 having spaced and squared bores receiving the squared outer ends 120 of a horizontally alined series of master bits 121 which series project inwardly midway between the upper and lower ends of the boring heads, and through openings 116$^a$ in the plate 116, as best seen in Figs. 5 and 8. In this or some similar manner the master bit gears 119 are rotatably mounted.

Figure 13:
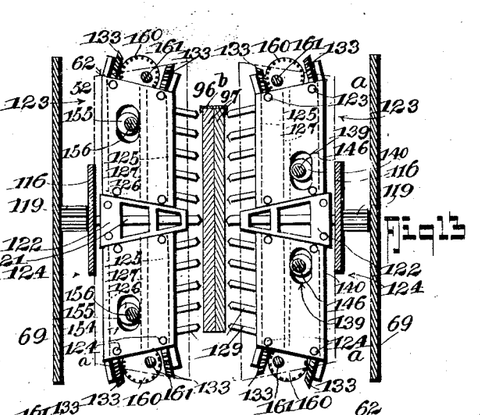
Fig. 13 is a view similar to Fig. 11 with the boring heads open.
Figure 14:
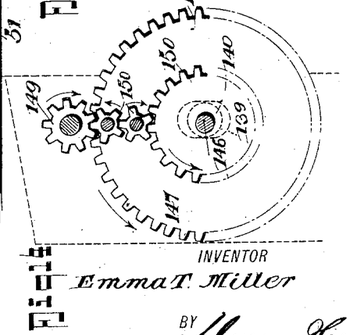
Fig. 14 is an enlarged detail of certain of the gearing connections shown in Fig. 9.

By reference to Fig. 4 it will be noted that the master bits 121 of the two boring heads 52 and 53 arranged in horizontal series as before described, bore through the blanks 97 in opposite directions, the inner portions of these master bits extending through openings 122$^a$ of transverse bars 122 which, with their end pieces 122$^b$ form guide frames midway between the upper and lower edges of each boring head for the upper and lower bit frames 123 and 124 thereof, as seen particularly in Figs. 8 and 13, the said guide frames being bolted by bolts 122$^c$, see Fig. 7, through their end pieces 122$^b$, to the inner side plates 62 so as to move with the boring heads. It will be noted that the upper and lower surfaces of the guide frames are inclined in conformity with the inclination of the adjacent edges of the bit frames 123 and 124, the latter of which are thus shifted toward one another in each boring head by virtue of their relative movement with respect thereto and which is brought about by the mechanism to be presently described, it being also noted that the inner surfaces of the inner side plates 62 are provided above and below said guide frames with parallel guide grooves 62$^a$ into which project rollers 123$^a$ and 124$^a$ extending from the ends of the bit frames 123 and 124, see Figs. 8, 13, and 23.

Figures 15, 16, 17, 18:
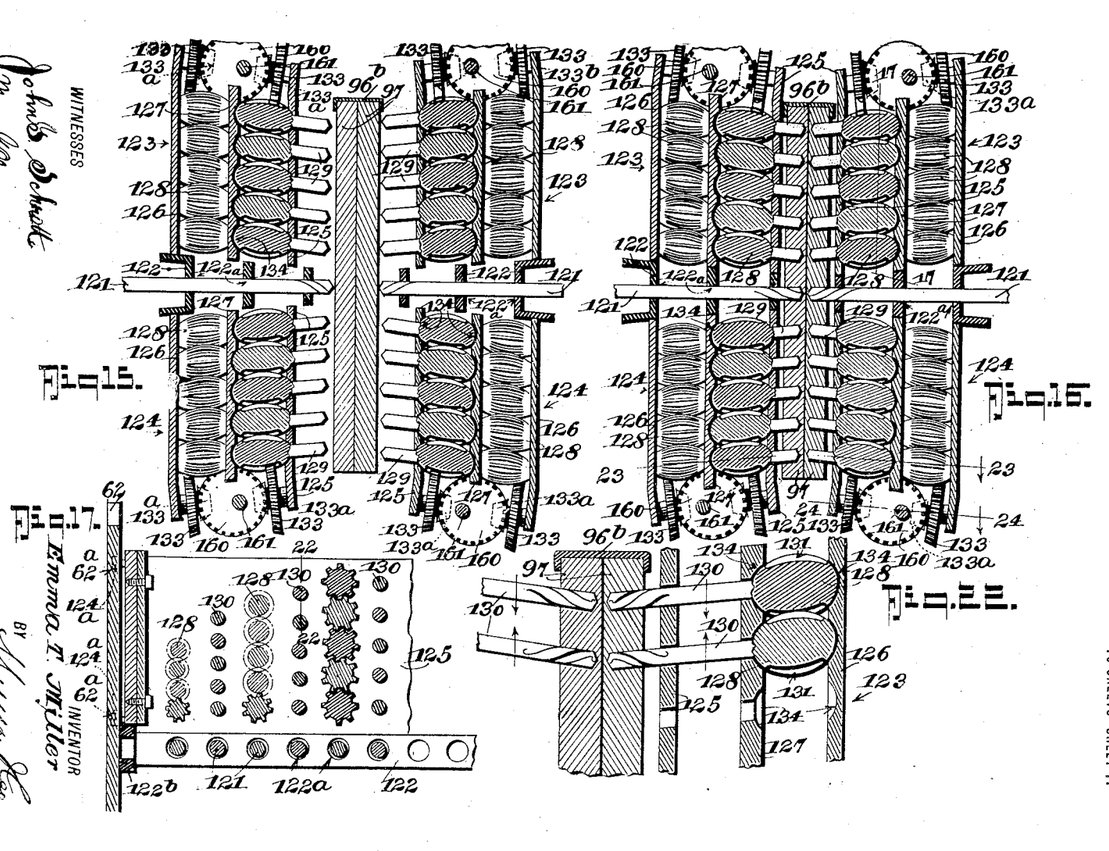
Fig. 15 is a detail vertical section taken substantially on line 15—15 of Fig. 4, with the boring heads open.
Fig. 16 is a similar view with the boring heads closed.
Fig. 17 is a detail vertical section taken substantially on line 17—17 of Fig. 16.
Fig. 18 is an enlarged side view showing the adjacent portions of the boring heads and a blank held in position therebetween.

Each of the bit frames includes inner and outer plates 125 and 126 and an intermediate plate 127, and between these plates are mounted two series of bits 128, one series having short stems 129 projecting through the inner plate 125 as seen in Figs. 15 and 16, with the heads thereof between the inner and intermediate plates 125 and 127 and the other series having long stems 130 projecting through the inner and intermediate plates 125 and 127 with their heads mounted between the outer and intermediate plates 126 and 127.

Figure 26:
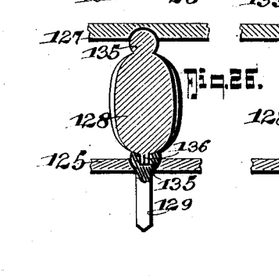
Figs. 26, 27, and 28 are enlarged detail sections through certain modified forms of bits.
Figures 27, 28:
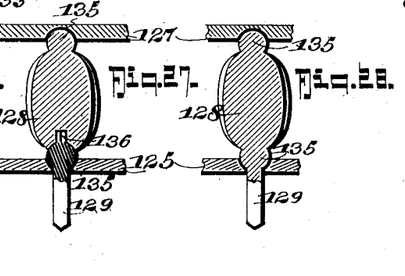

Each of the bits, so disposed, has its head in the form of an ovoid, and provided with longitudinally extending teeth 131, its rounded end portions being rotatably supported in recesses 134 in the surfaces of the plates 125, 126, and 127, as seen by reference to Fig. 22, although the bits may have integral spherical end knobs 135 to form the bearings thereof, as seen in Fig. 28, or their heads, provided with such knobs at one end, may be separate from their stems with intervening knobs 135, joined by extensions 136 of either the heads, as seen in Fig. 26, or the stems, as seen in Fig. 27.

It will be noted from Fig. 22 that the recesses 134 are disposed so as to maintain the several bits of the bit frames in desired relation in respect to the plane of movement of the bit frames, these bits being arranged in vertical series within each bit frame, of which the heads of the outer bits of the series are in engagement with the bit rotating gears 133, so as to be driven thereby.

Figure 9:
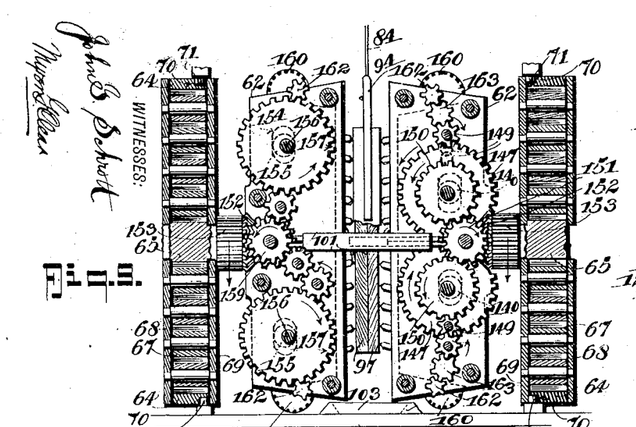
Figs. 9 and 10 are vertical sectional views taken respectively on lines 9—9 and 10—10 of Figs. 4 and 7.
Figure 10:
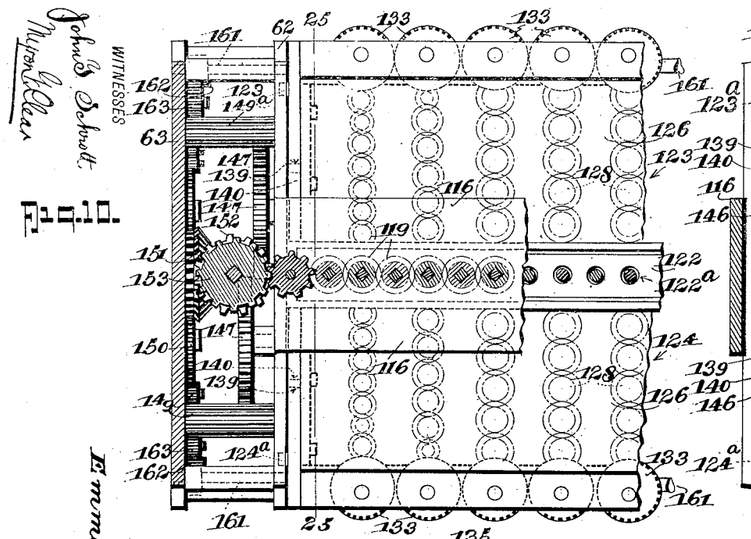
Figures 11, 12:
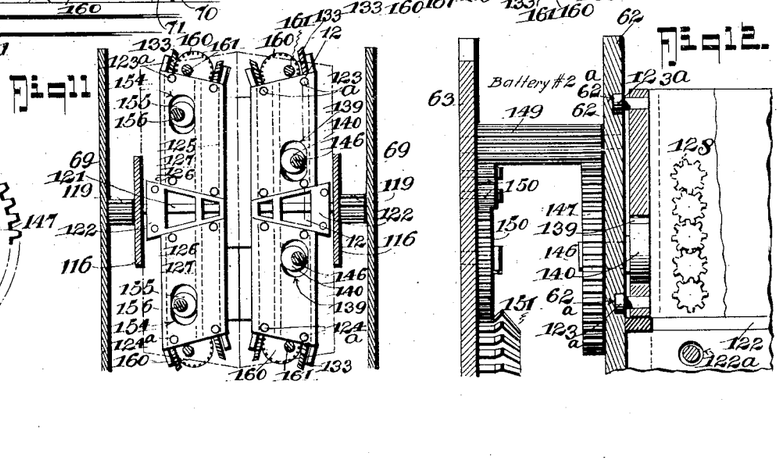
Fig. 11 is a vertical sectional view taken on line 11—11 of Fig. 4.
Fig. 12 is an enlarged detail section on line 12—12 of Fig. 11.
Figure 11:
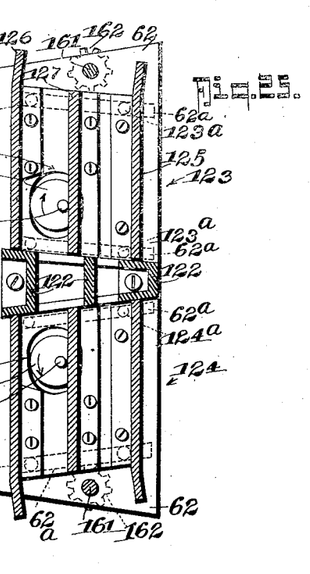

By a comparison of Figs. 15 and 16 it will be noted that the movements of the bit frames, as described, provide for the boring of angular openings in the blanks in quick clean movements. As seen in Figs. 9 and 12 in particular, each of the bit frames 123 and 124 of the boring head 53, has its ends provided with vertically slotted openings 139 in which extend cams 140 secured upon the inner ends of short shafts 146 which latter extend into the spaces between the side plates 62 and 63 and are there provided with gears 147 in operative engagement through idlers 149 and 150 with bevel gears 151 which, as seen in Fig. 5, are in mesh with the bevel portions 152 of gear wheels 153 at the inner ends of the shafts 55, and in mesh with and driving the series of master bit gears 119 before referred to.

The openings 154 of the bit frames of the boring head 52 are engaged by cams 155, which latter are secured upon shafts 156 having thereon gear wheels 157 as seen in Fig. 9, the latter in communication through a series of idlers 158 and 159 with the bevel portion 152 of the respective gear 153.

The gears 133 before mentioned, driving the series of bits of the bit frames 123 and 124, are mounted on stub shafts with smaller bevel gears 133$^a$ as seen in Figs. 23 and 24, and are engaged by gears 160 eccentrically secured in a series upon shafts 161 journaled in the upper and lower portions of the boring heads 52 and 53, through the inner side plates 62 and provided with gears 162 in mesh either directly or through idlers 163 with the cam shaft gears 147 and 157 as in Fig. 9. Thus, the eccentric gears 160 will follow the movements of the bit frames relative to the boring heads during inward and outward movement of the latter, so as to remain in uniform engagement with the bevel gears 133ª at all times.

Thus, it will be understood, in operation when the boring heads 52 and 53 are moved toward one another against blanks 97 disposed therebetween, the several bit frames 123 and 124 are shifted with respect to and upon the inner fixed side plates 62 of the boring heads, as the bits 129 and 130 pass through the blanks so as to effect a quick clean movement of the same in operation, it being understood of course that the same is true when the heads are moved apart so as to withdraw the several bits 129 and 130 with just as quick and clean movements as is provided in thrusting the same into the blanks.

It is obvious furthermore that the several master bits 121 engage the blanks in the first instance, extending as they do, as before explained, between the upper and lower bit frames of the boring heads, and thus clamp the blanks firmly in position for the proper engagement of the several bits 131, and that the connections as shown and described provide for the constant rotation of both the master bits and the bits of the bit frames 123 and 124.

I claim:—

1. In a boring machine, the combination of a pair of relatively movable boring heads, each having a pair of oppositely rotating members provided with projecting lugs, arms pivoted at one end adjacent said members and having inner free ends engageable by said lugs to raise the arms, a vertically movable weight actuated by said arms in their vertical movements, a frame in which the several parts are mounted, having a receptacle for blanks, a pair of arms pivoted for movement into and out of said receptacle, flexible connections attached at one end to said weight and extending through the outer ends of the last named arms, grappling members secured to the opposite ends of said flexible connections for movements with said arms into and out of the blank receptacle, and flexible controlling connections between said last named arms and one of the boring heads.

2. In a boring machine, the combination of a pair of relatively movable boring heads, a pair of oppositely rotating rings adjacent each boring head, provided with projecting diametrically opposed lugs, arms pivoted at one end adjacent said members and having inner free ends beneath which the said lugs are engageable in the rotation of said members to raise the arms at intervals, a vertically movable weight engaged and elevated by the said arms in their upward movements, a frame in which the several parts are mounted, having a receptacle for blanks, a pair of arms pivoted intermediate their ends in the frames for movements at one end into and out of the said receptacle, flexible connections attached to said weight and extending through the said ends of the last named arms, grappling members secured to the opposite ends of said flexible connections for movements with said arms into and out of the blank receptacle, and flexible controlling connections extending between the opposite ends of the last named arms and one of the said boring heads.

3. In a boring machine, the combination with a pair of spaced relatively movable boring heads, and a frame, within which said boring heads are adjustable, having a blank receptacle, of a pair of arms pivoted in the frame and movable into and out of said receptacle above the boring heads and having controlling connections with one of said boring heads, a pair of grappling members movable with said arms, and automatically controlled connections for lowering said grappling members with respect to the arms when the latter are over the space between said boring heads, including flexible connections extending through the free ends of said arms, a vertically adjustable weight to which said last named connections are attached, and means for raising and lowering said weight at spaced intervals.

4. In a boring machine, the combination with a pair of spaced relatively movable boring heads, and a frame within which said boring heads are adjustable, having a blank receptacle, of a pair of arms pivoted in the frame and movable into and out of said receptacle above the boring heads and having controlling connections with one of said boring heads, a pair of grappling members movable with said arms, and automatically controlled connections for lowering said grappling members with respect to the arms when the latter are over the space between said boring heads, including flexible connections extending through the free ends of said arms, a vertically adjustable weight to which said last named connections are attached, pivoted arms having their free ends engageable with the weight to raise the same, and oppositely rotating members adjacent one of the boring heads having projecting lugs engageable with and disengageable from the last named arms in the rotation of the said members.

5. In a boring machine, the combination with a pair of spaced relatively movable boring heads, and a frame within which said boring heads are adjustable, having a said blank receptacle, of a pair of arms pivoted in the frame and movable into and out of said receptacle above the boring heads and having controlling connections with one of said boring heads, a pair of grappling members movable with said arms, and automatically controlled connections for lowering said grappling members with respect to the arms when the latter are over the space between said boring heads, including flexible weight controlled connections carrying the said grappling members and extending through portions of the said arms, and with which the grappling members are movable independent of the arms.

6. In a boring machine, the combination with a pair of spaced relatively movable boring heads, and a frame within which said boring heads are adjustable, having a blank receptacle, of a pair of arms pivoted in the frame and movable into and out of said receptacle above the boring heads and having controlling connections with one of said boring heads, a pair of grappling members movable with said arms, and automatically controlled connections for lowering said grappling members with respect to the arms, when the latter are over the space between the said boring heads.

7. In a boring machine, the combination with a pair of spaced relatively movable boring heads and a frame within which said boring heads are adjustable having a blank receptacle, of means for automatically withdrawing blanks from said receptacle and feeding the same between said heads, including a pair of grappling members having spurs for engaging the blanks, means for moving said members into and out of said receptacle, and other means for raising and lowering said members into and out of the space between said boring heads.

8. In a boring machine, the combination with a pair of relatively movable boring heads, and a frame within which said boring heads are adjustable, having a blank receptacle, of means for automatically withdrawing said blanks from said receptacle and feeding the same between the said boring heads, including a pair of grappling members having means for engaging the sides of the blanks, and means carried by the boring heads and movable therewith to disengage the grappling members from the blanks when the boring heads are moved toward one another.

9. In a boring machine, the combination with a pair of relatively movable boring heads, and a frame within which said boring heads are adjustable, having a blank receptacle, of means for automatically withdrawing blanks from said receptacle and feeding the same between the said boring heads, including a pair of grappling members having means for engaging the sides of the blanks, and means carried by the boring heads and movable therewith to disengage the grappling members from the blanks when the boring heads are moved toward one another, including lugs having inclined faces and engageable between the blanks and the grappling members to force the latter away from the blanks.

10. In a boring machine, the combination with a pair of boring heads between which a blank is held during the boring operation, movable away from one another to permit the blank to drop at the end of the boring operation, of a trough below the boring heads having a lower opening through which the blanks are guided, and an inclined discharge chute below the said trough and into which the blanks are movable through the trough openings.

11. In a boring machine, the combination of a pair of boring heads between which a blank is held during the boring operation, movable away from one another at the end of the boring operation to permit the blank to drop, of a trough below the boring head having a lower opening through which the blanks are guided, a normally horizontal chip pan below the trough opening, a discharge chute for the blanks below and at one side of the said chip pan, a discharge chute for the chips below and at the opposite side of the chip pan, and means for periodically tilting the said chip pan to permit of the passage of a blank thereby and to discharge the contents of the pan into the said chip discharge chute.

12. In a boring machine, the combination with a pair of boring heads between which a blank is held during the boring operation, movable away from one another at the end of the boring operation to permit the blank to drop, of a trough below the boring head having a lower opening through which the blanks are guided, a normally horizontal chip pan below the trough opening, a discharge chute for the blanks below and at one side of the said chip pan, a discharge chute for the chips below and at the opposite side of the chip pan, and means for periodically tilting the said chip pan to permit of the passage of a blank thereby and to discharge the contents of the pan into the said chip discharge chute, said means including connections leading to and actuated by one of said boring heads, whereby to time the tilting movement of the chip pan with the movement of the boring heads to release the blanks.

13. In a boring machine, the combination with a pair of boring heads between which a blank is held during the boring operation, movable away from one another to permit the blank to drop at the end of the boring operation, of a trough below the boring heads having a lower opening through which the blanks are guided, and an inclined discharge chute below the said trough and into which the blanks are movable through the trough opening, a normally horizontal chip pan below the trough opening, and means for tilting said pan to permit of the passage of the blank thereby.

14. In a boring machine, the combination of a pair of relatively movable boring heads, of a chip pan normally disposed in horizontal position below said boring heads for receiving the chips therefrom, an inclined chip discharge chute at one side of and below said chip pan, and means for periodically tilting the chip pan to discharge its contents into said chip chute.

15. In a boring machine, the combination of a pair of relatively movable boring heads, of a chip pan normally disposed in horizontal position below said boring heads for receiving the chips therefrom, an inclined chip discharge chute at one side of and below said chip pan, and means for periodically tilting the chip pan to discharge its contents into said chip chute, said means including connections leading to and actuated by one of said boring heads, whereby to time the movement of said chip pan with that of the boring heads.

16. In a boring machine, the combination with a frame and a pair of relatively movable boring heads in the frame, of a chip pan disposed below the said boring heads and normally in a horizontal position, said pan being provided with end trunnions, bearings carried by the frame and in which said trunnions are journaled, a gear wheel secured upon one of the trunnions, a rack bar having movement in the frame and engaging said gear wheel, and connections between the rack bar and one of said boring heads whereby to tilt the chip pan in timed relation to the movements of the boring heads for discharging its contents.

17. In a boring machine, the combination of a pair of boring heads movable relatively to one another in a horizontal plane and each having outstanding shafts adjacent the opposite sides thereof, provided with squared outer portions, rotating rings disposed on each of the said shafts and having toothed inner peripheries, series of gears connecting the said inner toothed peripheries of the rings with said shafts, said rings also having outer cam grooves, a frame in which said heads are disposed having rigid lugs projecting into the said grooves, spaced plates rigidly connected to each head and between which the said rings are rotatably supported in connection with the heads, shafts rotating in the frame in axial alinement with said first named shafts and having squared sockets receiving the squared shaft ends, and mechanism for rotating said last named shafts.

18. In a boring machine, the combination of a pair of boring heads movable relatively to one another in a horizontal plane and each having outstanding shafts adjacent the opposite sides thereof, provided with squared outer portions, rotating rings disposed on each of the said shafts and having toothed inner peripheries, series gears connecting the said inner toothed peripheries of the rings with the said shafts, said rings also having outer cam grooves, a frame in which said heads are disposed having rigid lugs projecting into the said grooves, spaced plates rigidly connected to each head and between which the said rings are rotatably supported in connection with the heads, shafts rotating in the frame in axial alinement with said first named shafts and having squared sockets receiving the squared shaft ends, and mechanism for rotating said last named shafts, including a driven shaft having a master gear adjacent each boring head, driving means for said shafts, gears on said socket shafts, one of which is in mesh with the respective master gear, and an intermediate gear connecting the master gear with the other shaft gear.

19. In a boring machine, the combination of a pair of boring heads movable relatively to one another in a horizontal plane and each having outstanding shafts provided with squared outer portions, rotating rings disposed on and geared to said shafts and provided with annular cam grooves, a frame in which said heads are disposed having rigid lugs projecting into said grooves, shafts rotating in the frame in axial alinement with said first named shafts and having squared sockets receiving the squared shaft ends, and mechanism for rotating said last named shafts.

20. In a boring machine, the combination of a pair of boring heads movable relatively to one another in a horizontal plane and each having outstanding shafts provided with squared outer portions, rotating rings disposed on and geared to said shafts and provided with annular cam grooves, a frame in which said heads are disposed having rigid lugs projecting into said grooves, shafts rotating in the frame in axial alinement with said first named shafts and having squared sockets receiving the squared shaft ends, and mechanism for rotating said last named shafts including a driven shaft having a master gear adjacent each boring head, gears on said last named shaft, one of which is in mesh with the respective master gear, and an intermediate gear connecting the master gear with the other gear shaft.

21. In a boring machine, the combination of a pair of boring heads movable relatively to one another, in a horizontal plane, and each having spaced rigid side plates and spaced walls connecting said side plates and extending along the head, a series of master bits extending inwardly through the inner wall of each head, gears on said master bits and in mesh with one another between the said walls, a pair of driven shafts extending into each head and into the space between the said side walls, said shafts having gears in mesh with the master bit gears, upper and lower bit frames above and below the master bits of each head having series of bits therein gearedly connected to one another, means for driving said bits of the bit frames, and means within the head supporting the said bit frames for movement inwardly with respect to the master bits, and independent of the movement of the heads.

22. In a boring machine, the combination of a pair of boring heads movable relatively to one another, in a horizontal plane, and each having spaced rigid side plates and spaced walls connecting said side plates and extending along the head, a series of master bits extending inwardly through the inner wall of each head, gears on said master bits and in mesh with one another between the said walls, a pair of driven shafts extending into each head and into the space between the said side walls, a pair of bit frames in each head, said bit frames being shiftable with reference to the master bits, and movable with the heads, and means for moving said bit frames independent of the movement of the heads during the movements of the latter.

23. In a boring machine, the combination of a pair of boring heads movable relatively to one another in a horizontal plane and each having spaced rigid side plates and spaced walls connecting said side plates and extending along the head, a series of master bits extending inwardly through the inner wall of each head, gears on said master bits and in mesh with one another between the said walls, a pair of bit frames in each head, a pair of driven shafts extending into each head and into the space between the said side walls, said bit frames of each head being movable with the head and slidable relatively to the head, and connections for moving the frames of each head inwardly and outwardly with respect to the master bits thereof.

24. In a boring machine, the combination of a pair of boring heads movable relatively to one another in a horizontal plane and each having spaced rigid side plates and spaced walls connecting said side plates and extending along the head, a series of master bits extending inwardly through the inner wall of each head, gears on said master bits and in mesh with one another between the said walls, a pair of driven shafts extending into each head and into the space between the said side walls, a pair of bit frames in each head, said bit frames of each head being disposed above and below the master bits and movable with the head, guide frames in each head and with respect to which the bit frames are movable, and means including a series of gears disposed in the spaces between the rigid side plates for actuating the bit frames from the said shafts.

25. In a boring machine, the combination of a pair of boring heads movable relatively to one another in a horizontal plane, each having a horizontal series of master bits, upper and lower bit frames above and below the master bits in each of said heads, a plurality of bits carried by each of the said bit frames and gearedly connected to one another, connections for rotating the master bits, and means for shifting the bit frames of each head with respect to one another during the movements of the head.

26. In a boring machine the combination of a pair of boring heads movable relatively to one another in a horizontal plane, each head having upper and lower bit frames therein and each frame including spaced walls provided in their opposing surfaces with cavities and certain of which have openings communicating with the said cavities, bits extending through the said openings and having enlarged ovoidal heads disposed between the said plates and having the ends thereof disposed in the said cavities, said heads being provided with teeth thereon, the teeth being in engagement with one another whereby to gearedly connect the entire series of bits, connections for rotating the said bits, connections for moving said bit frames and shifting the same with respect to the master bits during such movement, and a series of master bits extending between the bit frames of the heads.

27. In a boring machine, the combination of a pair of boring heads movable relatively to one another in a horizontal plane, a pair of bit frames disposed in vertically spaced relation in each of said heads, bits carried by the said bit frames, connections for moving the heads toward and away from one another with the said bit frames, and connections for moving the bit frames with respect to said boring heads during the movements of the heads.

28. In a boring machine, the combination of relatively movable boring heads, upper and lower series of relatively shiftable bits in each of the boring heads, and a series of bits in each head projecting permanently in a horizontal plane at the center thereof and between said first series.

29. In a boring machine, the combination of relatively movable boring heads, each of which is provided therein with series of angularly disposed bits movable therewith and shiftable with respect thereto during the movement of the heads.

30. In a boring machine, the combination of boring heads movable toward and away from one another, and series of boring bits in each head movable therewith and shiftable vertically and horizontally with respect thereto during such movement.

31. In a boring machine, the combination with a pair of spaced relatively movable boring heads, and a frame within which said boring heads are adjustable, having a blank receptacle, of means for automatically withdrawing blanks from said receptacle and feeding the same between said heads, including a series of clamping members for engaging and holding the blanks in pairs in said receptacle, and grappling members movable into and out of said receptacle and having means for engagement with said clamping members.

32. In a boring machine, the combination with a pair of spaced relatively movable boring heads, and a frame within which said boring heads are adjustable, having a blank receptacle, of means for automatically withdrawing blanks from said receptacle and feeding the same between said heads, including a series of clamps, each having means to engage and hold a pair of blanks and having side openings, and grappling members movable into and out of the receptacle and having spurs for engagement within the side openings of said clamps.

33. In a boring machine, the combination with a pair of spaced relatively movable boring heads, and a frame within which said boring heads are adjustable, having a blank receptacle, of means for automatically withdrawing blanks from said receptacle and feeding the same between said heads, including a series of clamps, each having means to engage and hold a pair of blanks and having side openings, and grappling members movable into and out of the receptacle and having spurs for engagement within the side openings of said clamps, said receptacle having rollers at the sides of its blanks and against which said grappling members engage to shift the latter toward the blanks and the said clamps.

34. In a boring machine, of the character described, bit frames, each having spaced bit plates provided with companion recesses in their opposing faces, and bits having their heads between said plates with portions extending into and rotatable within said recesses.

35. In a boring machine of the character described, bit frames, each having spaced bit plates provided with companion recesses in their opposing faces, and bits having their heads between said plates and provided with spherical projections rotatable within said recesses.

36. In a boring machine of the character described, bit frames each having spaced bit plates provided with companion recesses in their opposing faces, and bits each having a head and a shank, the head being disposed between said plates and having a spherical projection at one end to enter the corresponding recess of one of the plates, and also having a recess at its opposite end, and the shank extending through the other plate and having a spherical projection at its inner end to enter the recess of the latter plate and the recess of the head, said head and said shank projection having relatively engaging squared openings and extensions, for the purpose described.

EMMA T. MILLER.